UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

YELLOW TO BROWN VAT DYES.

1,126,475.  Specification of Letters Patent.  Patented Jan. 26, 1915.

No Drawing.  Application filed July 2, 1914.  Serial No. 848,588.

*To all whom it may concern:*

Be it known that I, MAX HENRY ISLER, citizen of the Swiss Republic, residing at Manheim, Germany, have invented new and useful Improvements in Yellow to Brown Vat Dyes, of which the following is a specification.

I have discovered new and valuable vat coloring matters of the anthraquinone series which I regard as probably possessing a constitution corresponding to the formulæ

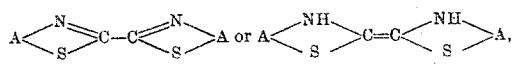

where A represents an anthraquinone residue, either substituted or not. For the purposes of this invention, I regard these two formulæ as equivalent. I can obtain my new coloring matters by treating ortho-halogen-acetyl-aminoanthraquinone or a derivative thereof with sulfur or with a compound giving rise to sulfur, or by treating ortho-amino-anthraquinone-mercaptan, or a derivative thereof with a compound capable of introducing the oxilic acid residue, for instance oxalyl chlorid.

My new coloring matters are characterized by the following properties. They consist when dry of yellow to brown powders which contain nitrogen and sulfur, are insoluble in water and in dilute acids and alkalis, they dissolve in concentrated sulfuric acid giving yellow to brown solutions which do not change on the addition of boric acid. With alkaline hydrosulfite solution they yield violet vats which dye cotton fast yellow to brown shades of excellent fastness.

The following examples will serve to illustrate further the nature of this invention, which, however, is not confined to these examples. The parts are by weight.

Example 1: Boil together, for several hours, while stirring, twenty parts of 1-chlor-2-acetyl-aminoanthraquinone, forty parts of naphthalene, or other indifferent solvent of high boiling point, and twenty parts of sulfur. Then allow the melt to cool down to about 100° C. and remove the naphthalene and excess of sulfur by any convenient method, for instance, by treatment with ortho-dichlorbenzene, whereupon the coloring matter remains behind in the form of crystals. It is very difficultly soluble in boiling nitrobenzene, but can be re-crystallized from this solvent and obtained in a pure state. It is also extremely difficultly soluble in other organic solvents of high boiling point. It dissolves in concentrated sulfuric acid, the solution being yellow which does not change on the addition of boric acid or of formaldehyde. In alkaline hydrosulfite solution it yields a violet vat which colors cotton violet shades which, upon washing, become first green and then lemon yellow. In this example, the 1-chlor-2-acetyl-aminoanthraquinone can be replaced by other ortho-halogen-acetyl-amino-anthraquinone or by a derivative of these. For instance, 1.3-dibrom-2-acetyl-amino-thraquinone yields a yellowish brown dye and 1-chlor-3-methyl-2-acetyl-aminoanthra-quinone yields a brown dye.

Example 2: Suspend twenty parts of 2-aminoanthraquinone-1-mercaptan, preferably in the form of its alkali salt, in from three hundred to four hundred parts of dichlorbenzene, or other indifferent solvent. Then stir well, while heating to from 180° to 200° C. and add twenty parts of oxalyl chlorid. When the reaction is complete allow to cool to about 130° C. filter off the crystalline coloring matter, which if desired can be dissolved in concentrated sulfuric acid, and precipitated by means of water, in order to bring it into a condition more suitable for dyeing and printing. It has properties identical with those of the coloring matter obtained according to the foregoing Example 1.

In a similiar manner, coloring matters can be obtained from other ortho-aminoanthra-quinone-mercaptans, for instance, 3-methyl-2-aminoanthraquinone-1-mercaptan yields a product which dyes cotton clear lemon yellow shades. The condensation product obtainable from 1-aminoanthraquinone-2-mercaptan yields a yellow-brown solution in concentrated sulfuric acid, while the product from 1-amino-4-toluido-anthraquinone-2-mercaptan dissolves in concentrated sulfuric acid with a brown-olive color.

Now what I claim is:—

1. The new coloring matters of the anthraquinone series probably possessing a constitution corresponding to the formula:—

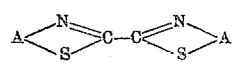

in which A represents an anthraquinone residue, which new coloring matters consists when dry of from yellow to brown powders, contain nitrogen and sulfur, are insoluble in water and in dilute acids and alkalis, are soluble in concentrated sulfuric acid yielding yellow to brown solutions, the color of which does not alter on the addition of boric acid, and which new coloring matters dissolve in alkaline hydrosulfite solution giving violet vats which dye cotton from yellow to brown shades of excellent fastness.

2. The new coloring matter of the anthraquinone series probably possessing a constitution corresponding to the formula

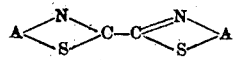

in which A represents an unsubstituted anthraquinone residue which coloring matter contains nitrogen and sulfur and consists when dry of a yellow powder which is insoluble in water and in dilute acids and alkalis, is soluble in concentrated sulfuric acid giving a yellow solution, the color of which does not change on the addition of boric acid, and which new coloring matter dissolves in alkaline hydrosulfite solution giving a violet vat which colors cotton violet shades, which upon washing become first green and then lemon yellow of excellent fastness.

In testimony whereof I have hereunto set my hand in the presence of two subscribing witnesses.

MAX HENRY ISLER.

Witnesses:
H. MERLE COCHRAN,
J. ALEC LLOYD.